US007035245B2

(12) United States Patent
Orr et al.

(10) Patent No.: US 7,035,245 B2
(45) Date of Patent: Apr. 25, 2006

(54) METHODS AND APPARATUS FOR MULTIPLEXING SIGNAL CODES VIA WEIGHTED MAJORITY LOGIC

(75) Inventors: Richard S. Orr, Montgomery Village, MD (US); Boris Veytsman, Reston, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 940 days.

(21) Appl. No.: 10/083,655

(22) Filed: Feb. 27, 2002

(65) Prior Publication Data

US 2002/0150068 A1    Oct. 17, 2002

Related U.S. Application Data

(60) Provisional application No. 60/271,756, filed on Feb. 27, 2001.

(51) Int. Cl.
*H04B 7/216* (2006.01)

(52) U.S. Cl. ...................................... 370/342; 370/320
(58) Field of Classification Search ..................... None
See application file for complete search history.

(56) References Cited

U.S. PATENT DOCUMENTS

| 5,117,441 | A | * | 5/1992 | Weigand | ...................... | 375/336 |
| 6,044,071 | A | * | 3/2000 | Spilker, Jr. | .................... | 370/320 |
| 6,108,317 | A | * | 8/2000 | Jones et al. | .................. | 370/320 |
| 2003/0193923 | A1 | * | 10/2003 | Abdelgany et al. | ......... | 370/342 |

FOREIGN PATENT DOCUMENTS

| WO | WO 00 13343 A | 3/2000 |
| WO | WO 01 08326 A | 2/2001 |

OTHER PUBLICATIONS

S. Butman et al., "Interplex-An Efficient Multichannel PSK/PM Telemetry System", IEEE Transactions on Communication, Jun. 1972.
J. Spilker et al., "Code Multiplexing via Majority Logic for GPS Modernization" Proceedings of the Institute of Navigation (ION) GPS—96, Sep. 15-18, 1998.
Spilker, "Digital Communications by Satellite", pp. 600-603, Prentice-Hall, Inc., 1977.
Claude E. Shannon et al., "A Mathematical Theory of Communication" pp. 32-125, The University of Illinois Press, 1964.
Easterling, M.F., "A Skin-Tracking Radar Experiment Involving the COURIER Satellite", IRE Trans. SET, pp. 76-84, Jun. 1982.
Gene L. Cangiani et al., "Methods and Apparatus for Generating a Constant-Envelope Composite Transmission Signal", U.S. Appl. No. 10/083,655, filed Sep. 27, 2001.

* cited by examiner

*Primary Examiner*—Duc Ho
(74) *Attorney, Agent, or Firm*—Edell, Shapiro & Finnan, LLC (57) ABSTRACT

CDMA codes are multiplexed into a constant-envelope composite signal using weighted majority logic. Based on a commanded power allocation among the signal codes, each signal code is assigned a weighting coefficient dictating the voting power the signal code has each time a vote is conducted, in a manner analogous to corporate shareholder voting. To multiplex the signal codes, a majority vote is conducted each chip period by summing the weighted chip values of the signal codes and assigning a binary value to the majority-voted composite chip based on the sign of the sum. An RF carrier is modulated in accordance with the value of the composite chip. The desired power distribution is achieved by requiring the power ratio of each signal code to be proportional to the square of the expected value of the cross-correlation between the signal code and a stored replica of the signal code at the receiver.

55 Claims, 6 Drawing Sheets

METHODS AND APPARATUS FOR MULTIPLEXING SIGNAL CODES VIA WEIGHTED MAJORITY LOGIC

CROSS REFERENCE TO RELATED APPLICATION

This application claims priority from U.S. Provisional Patent Application Ser. No. 60/271,756 entitled "Multiplexing CDMA Codes Via Weighted Majority Logic," filed Feb. 27, 2001. The disclosure of this provisional patent application is incorporated herein by reference in its entirety.

BACKGROUND OF THE INVENTION

1. Field of the Invention

The present invention relates to electronic communications and navigation systems and, more particularly, to methods and apparatus for efficiently multiplexing Code Division Multiple Access (CDMA) data streams into a constant-envelope composite signal using techniques based on majority logic.

2. Description of the Related Art

The revolution in digital communications that occurred in the latter half of the $20^{th}$ century stemmed largely from the 1940's work of Claude Shannon at AT&T Bell Laboratories, as introduced in "A Mathematical Theory of Communication," Bell Syst. Tech. J., vol. 27, pp. 379–423, 623–656, July–October 1948, the disclosure of which is incorporated herein by reference in its entirety. Shannon demonstrated the possibility of virtually error-free data communications on noisy channels as long as the transmission rate does not exceed a fundamental limit called the channel capacity. Prior to this realization, communication engineers relied solely on transmit power increase or brute-force redundancy (e.g., data rate shedding or bandwidth expansion) to improve the reliability of a link. One such form of redundancy is to transmit each data symbol an odd number of times, demodulate each symbol individually and decide in favor of the symbol value that occurs more frequently. This is simply decision by majority vote. In this use of majority voting, no combination of redundant data symbols occurs at the transmitter; the combination occurs as part of a decision process at the receiver. Fifty years of development from Shannon's theory have made obsolete this simple redundant encoding in favor of more efficient schemes that, unfortunately, function at the expense of increased decoding complexity.

The identical principal of redundancy has long been incorporated into design of digital logic circuits and subsystems. Triple modular redundancy (TMR) is a standard design practice for systems in which stringent availability and fault tolerance requirements exist. For example, the original design of the Space Shuttle made use of five guidance and control computers whose outputs were majority voted.

The majority vote principle has been recognized as a method to combine binary codes for at least 40 years; references dating to as early as 1962 are found, including: Easterling, M. F., "A Skin-Tracking Radar Experiment Involving the COURIER Satellite," IRE Trans. SET, pp. 76–84, June 1962; Braverman, D. J., "A Discussion of Spread Spectrum Composite Codes," Aerospace Corp., Report TDK-269, December 1963; Tausworthe, R. C., "Practical Design of Third-Order Phase-Locked Loops," Jet Propulsion Lab., Calif. Inst. of Tech., (internal document) TR 900–450, pp. 19–30, April 1971; Spilker, J. J., "Digital Communications by Satellite," Prentice-Hall Inc., Englewood Cliffs, N.J., pp. 600–603, 1977, the disclosures of which are incorporated herein by reference in their entireties. The purpose of code combination in the cited references, however, is to create a resulting single code with certain properties that make it desirable for use in ranging applications. Long pseudo-noise (PN) codes, consisting of random-appearing sequences of binary digits (1s and 0s) facilitate ranging by providing high resolution and freedom from the range ambiguities that may arise in periodic repetition of shorter sequences. More significantly, these effectively replace ranging based upon short, high-power pulses that require transmitters capable of very high peak power production.

Because acquisition (locating the time epoch) of long PN codes can be time consuming or can require massive parallel search capability, it is advantageous to build some substructure into the code that facilitates rapid acquisition without penalty in equipment or peak power requirements. In the aforementioned paper by Easterling, the idea of combining several PN sequences with relatively prime periods was advanced. The resulting code period is the product of the component periods. Easterling found that, if the combining is accomplished via majority vote, the epochs of each component code can be detected individually, and their coincidence used to determine the full code epoch. The effective power seen in each component code at a receiver is about 63% of its initial allocation due to the creation of undesired intermodulation components in the combination. In this application, there is no data communication associated with the codes; nor is there any end use of separating codes upon reception.

Two signals can be combined in a given bandwidth without mutual interference if placed on carriers in quadrature, i.e., the two independent, orthogonal sinusoidal components that exist at every frequency. When more than two signals are to occupy a given band without mutual interference, and each occupies the full available bandwidth, creative multiplexing techniques are needed to accomplish this, especially if the desired outcome is a signal having a low peak-to-average power ratio.

Interplex modulation was created with this need in mind, as reported by Butman, S. and U. Timor in "Interplex—An Efficient Multichannel PSK/PM Telemetry System," IEEE Trans. Comm., June 1972, the disclosure of which is incorporated herein by reference in its entirety. An interplex signal has constant envelope, i.e., its instantaneous power level does not change with time. Using quadrature carriers, interplex modulation can combine any number of data-bearing, PN spread binary codes. The component signals may have any assigned power distribution. Interplex modulation is quite efficient in representing three components (efficiency is never less than 75% for any power allocation), but its efficiency drops rapidly as more signals are added, and is generally not useful for more than five components. Interplex modulation has connections to majority vote logic not recognized by its inventors. These connections have been exploited in a generalization called Intervote, in which elementary majority voting techniques are combined with interplex modulation, as described in U.S. patent application Ser. No. 09/963,669 by Cangiani et al., entitled "Methods and Apparatus for Generating a Constant Envelope Composite Signal," filed Sep. 27, 2001, the disclosure of which is incorporated herein by reference in its entirety.

Though it had predecessors, the NAVSTAR Global Positioning System (GPS) became the world's first major navigation system relying on PN ranging and concomitant data transmission. In GPS, low-rate data signals that support the navigation mission are modulated onto PN ranging signals transmitted by a constellation of satellites in a manner almost transparent to the ranging function. Each satellite transmits no more than two distinct ranging codes in any one frequency band, and these codes are efficiently combined using quadrature multiplexing.

Under a program called GPS Modernization, the U.S. Government is studying techniques to enhance both the military and civilian utility of GPS. A possible outcome of this effort is the inclusion of three or four distinct PN codes in the signal transmitted by a satellite at one frequency. Means to employ majority logic techniques for multiplexing of these signals have been investigated by Spilker et al. in "Code Multiplexing via Majority Logic for GPS Modernization," Proc. ION GPS-98, Nashville, Tenn., September 1998, the disclosure of which is incorporated herein by reference in its entirety.

CDMA transmission of voice/data in terrestrial cellular networks places more stringent requirements on CDMA than any of the prior applications. Traffic is two-way, and the number of codes per cell can be as many as 64 now and 128 or more in the future. Code channels have various functions: pilot, paging, synchronization, control, and traffic. To avoid the dominance of one or a few signals (the "near-far" problem), power control is required at both the subscriber and base station terminals. Because the user mix continually varies due to newly initiated and recently completed calls, user motion and cell-to-cell handoffs, power control is dynamic and rapid (on the scale of milliseconds). Difficult channel conditions are posed by multipath interference and signal obstruction in urban environments. Data rates and traffic loads are certain to increase far beyond anything presently seen. Security of data flowing through the network is needed for operations, maintenance, accurate billing and privacy. Although the primary function of the system is data transmission, there are a variety of reasons, e.g. E911, why determination of subscriber position will be a required, integrated function for all future mobile networks. Despite advances in signal combining and multiplexing techniques, there remains a need a system capable of multiplexing CDMA signals efficiently into a constant-envelope composite signal for application to this complex environment.

SUMMARY OF THE INVENTION

Therefore, in light of the above, and for other reasons that become apparent when the invention is fully described, an object of the present invention is to efficiently combine signals into constant-envelope composite signals.

Another object of the present invention is to generate constant-envelope composite signals useful in terrestrial and satellite communication and navigation systems (e.g., GPS, CDMA cellular networks), mobile communication systems, including wireless telephony, and other systems employing spread spectrum signals or CDMA.

A further object of the present invention is to efficiently produce a constant-envelope composite signal regardless of the disparity in the desired power levels of the component signals.

Yet a further object of the present invention is to accurately achieve a desired power distribution among component signal in a constant-envelope composite signal, even with a substantial number of component signals and disparate target power levels.

Another object of the present invention is to combine a significant number of different signals into a constant-envelope composite signal without considerable loss of power efficiency.

Yet another object of the present invention is to efficiently combine multiple signal into a constant-envelope composite signal under the stringent requirements of CDMA voice/data transmission in terrestrial cellular networks and to adapt majority logic principles to support the unprecedented demands of current and future communications networks.

Still another object of the present invention is to avoid small signal suppression when combining signals of different power levels into a composite signal.

It is a further object of the present invention to minimize multiplexing loss when combining multiple signals into a composite transmission signal.

It is yet a further object of the present invention to allow use of saturated amplifiers in signal transmission by generating constant-envelope composite transmission signals.

It is another object of the present invention to implement a majority logic multiplexing scheme that is transparent to the receiving equipment.

The aforesaid objects are achieved individually and in combination, and it is not intended that the present invention be construed as requiring two or more of the objects to be combined unless expressly required by the claims attached hereto.

In accordance with the present invention, weighted majority logic is employed to efficiently multiplex a plurality of signals into a constant-envelope composite signal for transmission. In an exemplary embodiment, the majority logic multiplexing technique is used in a CDMA communication system transmitting multiple CDMA signals to a single location or to a group of spatially dispersed users. These signals are subject to direct sequence (DS) spread spectrum modulation using pseudo-noise (PN) codes and have a common, synchronous chip rate and carrier frequency.

A principal concept underlying the weighted majority logic employed in the system of the present invention can be likened to shareholder voting. Based on an input power allocation, each signal in the multiplex is essentially allocated a number of votes via weighting coefficients. The weighting coefficients dictate how much voting power each signal code has each time a vote is conducted. In order to multiplex the signal codes, a majority vote is conducted each chip period by summing the weighted chip values of the signal codes and assigning a positive or negative value to the output majority-voted composite chip based on the algebraic sign of the resulting sum. An RF carrier is modulated in accordance with the value of the composite chip, using for example, phase shift keying, and transmitted as a constant-envelope signal.

The values of the weighting coefficients are determined as a function of the commanded power distribution among the signals to be multiplexed. In particular, the desired power distribution ratio can be achieved by requiring the commanded power ratio of each signal code to be proportional to the square of the expected value of the cross-correlation between the signal code and a stored replica of the signal code at the receiver. This constraint gives rise to a set non-linear relationship between the commanded power ratio and the requisite number of votes, or weighting coefficients for the signal codes. The non-linear equations can be solved for the weighting coefficients through iterative numeric techniques.

To simplify the process of determining the weighting coefficients, the signal codes can be classified into two groups: a Gaussian group and a non-Gaussian group, wherein the non-linear equations need to be solved only for those signal codes in the non-Gaussian group. Components assigned to the Gaussian group are typically small in power and numerous; their qualification for belonging to this group is a mathematical criterion, assuring that a weighted sum of their chips, where the weighting is proportional to the square root of the power allocation, will result in a random variable described by a Gaussian probability distribution. In practice, these components typically are the user traffic channels. Components are placed in the non-Gaussian group if they are greater in power. Typically only a fewer components are assigned to the non-Gaussian group. Service signals such as pilot or paging codes, along with traffic channels for temporarily disadvantaged users, are candidates for the non-Gaussian group. The computed weighting coefficients are applied on a chip-by-chip basis to the signal code chip values over the period of time the commanded power distribution is in effect, and the weighting coefficients are recomputed each time the commanded power distribution is adjusted.

In accordance with another embodiment of the present invention, a desired power distribution among the signal codes to be multiplexed can be achieved using a cyclostationary majority logic scheme in which the allocation of votes may be varied for certain chips over a time interval. In particular, "solo" chips of non-Gaussian signal codes may be interlaced with unweighted majority-voted chip values to achieve a desired power distribution. The solo chips amount to a non-Gaussian signal code being given 100% of the votes for particular chip periods. In accordance with another cyclostationary majority logic scheme, two or more different weighted majority voting schemes (based on different sets of weighting coefficients) may be interlaced to achieve a desired power distribution among the multiplexed signal codes. Since a stationary majority logic solution may not be able to exactly match a desired power distribution, the cyclostationary techniques potentially enhance the ability to precisely achieve a desired power distribution, but this improvement is generally at the cost of some multiplexing loss.

In general, the majority logic multiplexing technique of the present invention minimizes power loss resulting from multiplexing, while avoiding small signal suppression even with widely varying power levels among the multiplexed signals. Moreover, multiplexing losses do not dramatically increase as the number of multiplexed signals increases (as is the case with interplex modulation).

The majority logic multiplexing technique of the present invention can be integrated into virtually any communication device or signal transmission system which can benefit from transmitting a plurality of multiplexed signals in a composite signal, including terrestrial and satellite communication and navigation systems, mobile communication systems, including wireless telephony, and other systems employing spread spectrum signals or CDMA. For example, the technique of the present invention can be used to synthesize network base station transmissions into a single PN sequence that represents all the required signals and accounts for the commanded power distribution. The present invention likewise facilitates techniques being considered for enabling mobile communication devices to operate at higher data rates by splitting its data across several codes and simultaneously transmitting all codes.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION OF THE PREFERRED EMBODIMENTS

Figure 1:
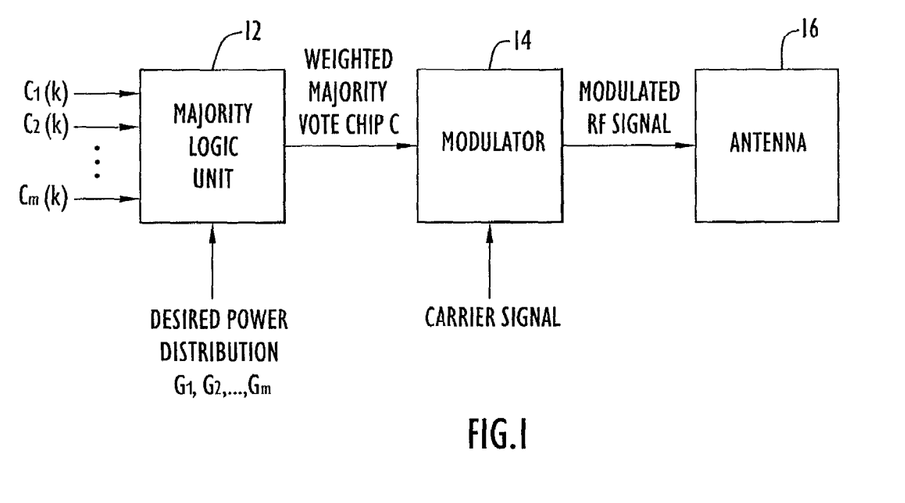
FIG. 1 is a block diagram of a modulation scheme employing majority logic in accordance with an exemplary embodiment of the present invention.

The following detailed explanations of FIGS. 1–6 and of the preferred embodiments reveal the methods and apparatus of the present invention. A diagrammatic illustration of an exemplary embodiment of the majority logic scheme of the present invention is shown in FIG. 1. A majority logic unit 12 receives M signal codes $C_1(k), C_2(k), \ldots, C_M(k)$ together with a commanded power distribution in the form of respective target gains $G_1, G_2, \ldots, G_M$ representing the desired transmit power for the individual signal codes. The integer number of signal codes M which can be combined is limited only by practical considerations of implementation, such as equipment constraints and acceptable power efficiency levels. Majority logic unit 12 combines the M signal codes to form a weighted majority vote composite signal. The weighted majority vote composite signal is then supplied to a modulator 14 which modulates an RF carrier signal in accordance with the value of the weighted signal to form the output modulated RF signal which is transmitted via an antenna 16.

By way of non-limiting example, the majority logic system of the present invention can be employed in a CDMA communication system transmitting multiple CDMA signals to a single location or to a group of spatially dispersed users. These signals employ binary phase-shift keying (BPSK), quadrature phase-shift keying (QPSK), or other N-ary phase-shift keying, direct sequence (DS) spread spectrum modulation (e.g., spread using a pseudo-noise PN code) and have a common chip rate and carrier frequency. The timing of the transmissions being under control of the transmitter, the multiple CDMA signals are chip-synchronous. The majority logic unit can be implemented in any combination of hardware and/or software.

For reasons of power control, a power weighting, or fraction of the available transmit power, is periodically assigned to each CDMA signal. That is, the system may frequently assess the channel conditions, such as interference, multipath and range, between the transmitter and each receiving user in order to adjust the transmit power required to transmit signals to each user. This commanded power distribution assignment, represented by the respective target gains $G_1, G_2, \ldots, G_M$, remains in effect for a period of time equal to a large number of spread spectrum chips (e.g., on the order of milliseconds). This commanded power distribution is provided to the majority logic unit 12 which uses this information to generate the value of the composite signal on a chip-by-chip basis. As used herein the term "power allocation" refers to any type of power control information that indicates desired, target or commanded power levels, power ratios or power distributions relating to the constituent signals to be multiplexed. In the present example, the power allocation is conveyed to the majority logic unit in the form of target gains $G_1, G_2, \ldots, G_M$; however, the power allocation referred to herein is not limited to any particular power control information format.

During each interval in which the desired power allocation is constant (i.e., the time period during which the target gains are fixed at particular levels), majority logic unit 12 receives as input a sequence of chips to be transmitted for each of the M signal codes $C_1(k), C_2(k), \ldots, C_M(k)$. These chips are represented as binary digital bitstreams of logical ones and zeros to be applied in some manner to the RF carrier signal to be transmitted. The signals assume analog values, nominally denoted as −1 and +1, corresponding to the logic values 1 and 0, respectively. The values of signal codes $C_1(k), C_2(k), \ldots, C_M(k)$ fluctuate at the chip rate. The chip rates are the rate of the digital codes, used for example in the GPS system and in CDMA cellular phone systems, and can be on the order of 1 MHz and higher. Accordingly, based on the commanded power allocation, the majority logic must be applied on a chip-by-chip basis to produce a composite signal, which is transmitted in a single direct sequence spread spectrum signal representing the multiple input CDMA signals. The modulator ensures that the total instantaneous power remains constant for all chip intervals, such that the baseband DS spread spectrum signal has a constant envelope.

A principal concept underlying the majority logic employed in the system of the present invention can be likened to shareholder voting. Based on an input power allocation $\{G_1, G_2, \ldots, G_M\}$, each signal in the multiplex is allocated a number of votes, which may be fractional. At each PN chip epoch, the transmitted chip value is selected by summing the weighted chips of each code (number of votes times the analog chip value, ±1) and computing the algebraic sign of the result. This operation is represented by the formula in equation (1) below, where $v_i$ is the weighting coefficient (or simply "weight") reflecting the number of votes allocated to the i-th of the M signals, $C_i$ represents the analog chip value of that signal, ±1, "sgn" is the sign function (positive or negative), and C is the output chip value.

$$C = \text{sgn}\left(\sum_{i=1}^{M} v_i C_i\right) \quad (1)$$

Figure 2:
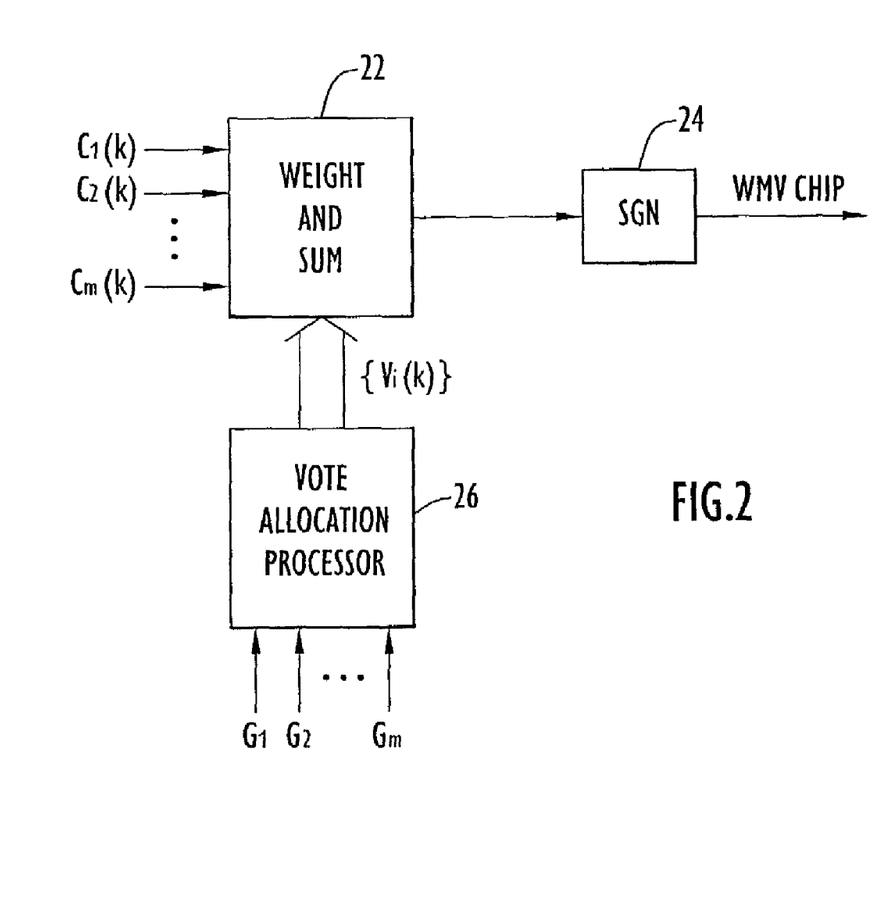
FIG. 2 is a block diagram of a majority logic unit according to the exemplary embodiment of the present invention.

This adaptation of majority logic is an important aspect of the multiplexing technique of the present invention that enables constant-envelope multiplexing of an arbitrary distribution of chip-synchronous CDMA signals. FIG. 2 conceptually illustrates the signal processing associated with the majority logic performed in accordance with equation (1). In particular, during each chip interval, each signal $C_i$ to be transmitted has a value of +1 or −1 in accordance with its logic state. Each signal $C_i$ is multiplied by a weighting coefficient $v_i$ corresponding to the number of "votes" of that signal, thereby weighting the value of the signal as a function of the desired overall power distribution of the signals to be transmitted (weight and sum block 22). The sign of the resultant value of the summation of the weighted signals $v_i C_i$ becomes the value of the composite signal C to be transmitted for the chip interval (SGN block 24). Using a constant-envelope modulation scheme (e.g., phase shift keying or frequency shift keying), the carrier is encoded with the value of the composite signal C and transmitted.

The key to equitable and efficient multiplexing is the prescription for allocating votes to the various user signals. In other words, the values of the number of votes or weighting coefficients $v_i$ must be properly selected so that the resulting composite signal does indeed reflect the desired power distribution. The processing required to appropriately determine the weighting coefficients $v_1, v_2, \ldots, v_M$ from the commanded power allocation given by $G_1, G_2, G_M$ is represented in FIG. 2 by vote allocation processor 26.

If the chips of each CDMA signal were weighted as in a linear multiplexer, that is, in proportion to the square root of their power allocation, the result as computed by equation (1) would not, in general, produce outputs that implement the desired power distribution. In particular, codes requiring only small amounts of power could become suppressed relative to more powerful codes. In the extreme, small signals might exert no influence whatsoever on the multiplex output and would disappear at the intended receiver. This small signal suppression, or capture, effect is commonly found as the result of nonlinear signal processing operations, and is analogous to the fact that no coalition of minority stockholders can ever outvote a 51% majority interest.

Faithful representation of the commanded power distribution is assured by the technique of the present invention by formulating a set of equations that constrains the cross-correlation of the resultant code and each of its component codes to be in proportion to the square root of the power allocated to the component. An example of equations which can be used to realize the present invention is described subsequently. The solution of the equations provides the appropriate number of "votes" for each code. A coefficient of proportionality parameter is also part of the solution. This parameter dictates the efficiency or multiplexing loss common to each code. The equations are formulated such that the constant is chosen as large as is possible, making the algorithm as efficient as it can be, in the sense that the multiplexing loss is minimized.

Figure 3:
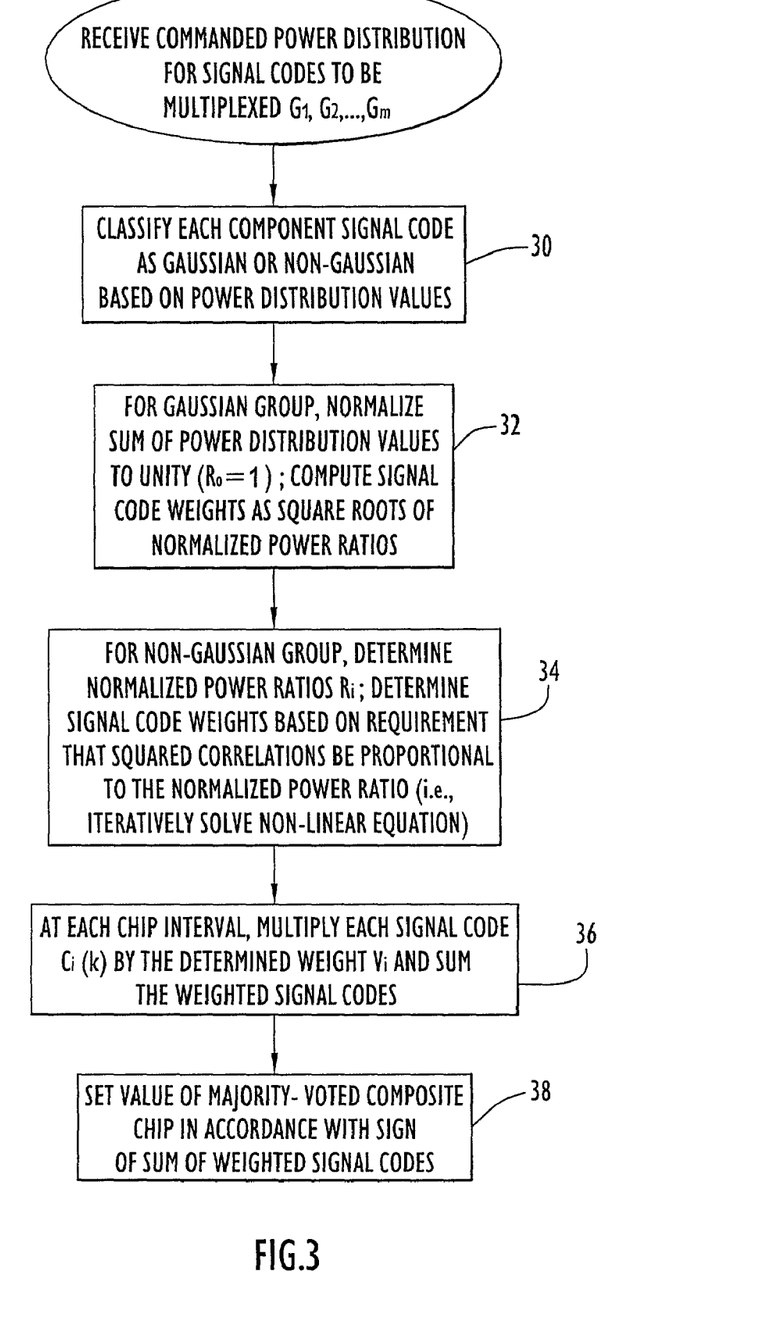
FIG. 3 is a functional flow diagram illustrating determination of signal code weighting coefficients used to compute a weighted sum of signal code chips in a stationary majority logic scheme according to the exemplary embodiment of the present invention.

A flow chart summarizing the operations required to determine the appropriate number of votes or weighting coefficients $v_i$ for each signal code is shown in FIG. 3. As previously described, the commanded power allocation in a CDMA system is regularly adjusted, but generally remains constant for a period of time equal to a large number of spread spectrum chips (e.g., on the order of at least milliseconds). The signal code weighting coefficients are determined each time the commanded power allocation changes and remain constant until the next adjustment to the commanded power allocation. In accordance with equation (1), the weighting coefficients are then applied to the corresponding signal code chip values on a chip-by-chip basis to determine the value of each majority-voted, composite chip.

The equations to be solved to determine the appropriate signal code weights are a highly nonlinear simultaneous set that must be solved by an iterative numerical method: To minimize the number of such equations, each component code is initially assigned to one of two groups, designated the "Gaussian" and "non-Gaussian" groups (operation 30 in FIG. 3). Components assigned to the Gaussian group are typically small in power and numerous; their qualification for belonging to this group is a mathematical criterion, presented below, assuring that a weighted sum of their chips, where the weighting is proportional to the square root of the power allocation, will result in a random variable described by a Gaussian probability distribution. In cellular telephone applications, these components typically are the user traffic channels. Components are placed in the non-Gaussian group if they are greater in power. Typically only a fewer components are assigned to the non-Gaussian group. Service signals such as pilot or paging codes, along with traffic channels for temporarily disadvantaged users, are candidates for the non-Gaussian group.

The commanded power distribution is described by a set of non-decreasing ratios, $\{R_i\}$, $0 \leq i \leq N$, where the lowest ratio, $R_0$, is taken to equal 1. Signal i is to have power $R_i$ times that of "signal 0." Signal 0 is defined as the Gaussian group and therefore consists of a number, $K \leq M$, of signals. If, for example, the commanded power levels of all K Gaussian signal codes are the same, signal "0" consists of K codes to each of which power 1/K is allocated. The remaining signals, $1 \leq i \leq N$, constitute the non-Gaussian group.

Signals are placed in the Gaussian group if their power allocation is less than a specified fraction of the total power. The threshold value for this test is a parameter that permits some flexibility in the assignment, but is typically in the range between approximately 0.05 and 0.1. That is, if the value $G_i$ represents no more than about five or ten percent of the total power of all the signals to be multiplexed, the signal code $C_i$ will typically be classified as Gaussian; otherwise, the signal code $C_i$ is classified as non-Gaussian. In general, the threshold for determining whether to classify the individual signal codes as Gaussian or non-Gaussian should be high enough to permit a large number of signals into the Gaussian group with only a few in the non-Gaussian group, and the specific value of the threshold is a function of the operational parameters and requirements of the particular communication system in which the scheme is used. For example, with a smaller number of signal codes, the threshold may be significantly higher than 0.1. It will be understood that the present invention is not limited to any particular threshold value or range of threshold values for determining which signal codes are Gaussian and non-Gaussian.

Figure 4:
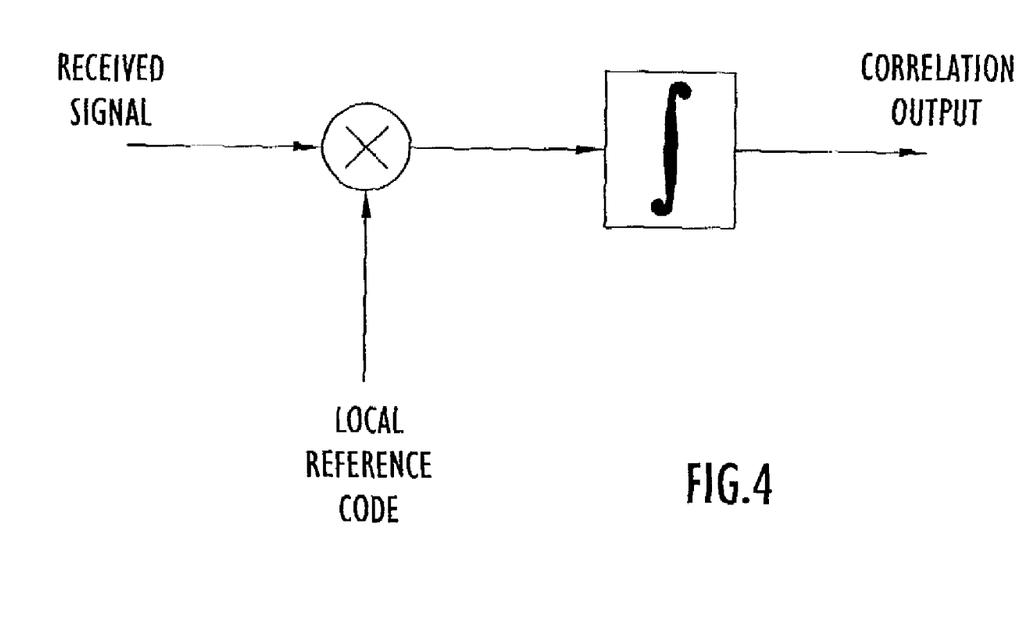
FIG. 4 is a conceptual illustration of a CDMA cross-correlation receiver.

A prerequisite to understanding the equations that must be developed and solved is knowledge of how the receiver intends to process its incoming information. A CDMA receiver performs the operation of cross-correlation between its received signal and a locally-stored replica of the currently code assigned to it. Cross-correlation consists of multiplying the received chip stream by the reference code chips and integrating (summing) the product, as shown in FIG. 4. It is a fundamental property of CDMA that when the received and reference codes are one and the same and time aligned, the correlator output will be large; when the time alignment is incorrect or the incoming code does not at all resemble the reference, the computed correlation will be small. Since the local reference is of fixed amplitude, independent of what is received, the strength of the received signal is measured by the magnitude of the correlator output. This is the signal strength measure the transmit power control subsystem is intended to regulate.

The following equations model this correlation process. Given a set of weights $\{v_i\}$, one can compute the probability that the transmitted chip matches the chip expected by the receiver. Denoting this probability by $p_i$, $0 \leq p_i \leq 1$, for the i-th code, the expected correlation value, $\alpha_i$, is found by noting that the chip product is +1 when the chips match, −1 when they mismatch, and that the mismatch probability is $(1-p_i)$:

$$\alpha_i = 1 \cdot p_i + (-1) \cdot (1-p_i) = 2p_i - 1. \tag{2}$$

By requiring that the squared correlations be proportional to the commanded power distribution, $$\alpha_i^2 = bR_i, \tag{3}$$

where b is a constant of proportionality, the probabilities in (2) are similarly constrained.

There are various ways to approach the calculation of the probabilities. As stated earlier, the defining characteristic of the Gaussian group is that its members combine to act like a single random variable with a Gaussian distribution. These probabilities may be expressed in terms of the mathematical error function, erf(x), defined as $$\mathrm{erf}(x) = \frac{2}{\sqrt{\pi}} \int_0^x e^{-t^2} \, dt. \tag{4}$$

Once the set of signal codes that constitute the Gaussian group is determined, computation of the weighting coefficients $v_i$ for the Gaussian signal codes can be determined as follows (operation 32 in FIG. 3). Since the collective power ratio $R_0$ of the Gaussian signal codes must be unity, the commanded power distribution values $G_1, G_2, \ldots, G_K$ must be normalized so that the sum of the normalized power distribution values equals unity. A normalization factor Norm is determined as the sum of the power distribution values of all K signal codes in the Gaussian group.

$$\mathrm{Norm} = \sum_{i=1}^{K} G_i \tag{5}$$

The normalized power distribution values for the signal codes in the Gaussian group are then given by:

$$G_N(i) = \frac{G_i}{\mathrm{Norm}}; \quad 1 \leq i \leq K \tag{6}$$

As previously noted, in the Gaussian group, the numbers of votes specified by the weighting coefficients $v_i$ to be multiplied by the signal code chip values $C_i(k)$ are proportional to the commanded power; thus, $$v_i = \sqrt{G_N(i)}; 1 \leq i \leq K \tag{7}$$

Returning to consideration of the non-Gaussian signal codes (operation 34 in FIG. 3), the power ratios $R_1, \ldots, R_N$ corresponding to the N non-Gaussian signal codes must be determined by normalizing the corresponding commanded power distribution values, or $$R_i = \frac{G_{i+k}}{Norm}; 1 \leq i \leq N \quad (8)$$

where K is the number of Gaussian signal codes.

Each chip in the multiplex may take on one of two values, ±1, making a total of $2^N$ possibilities at any time for the N non-Gaussian chips. If C represents a combination of non-Gaussian chips, S(C) is the weighted sum of that chip combination, i.e.

$$S(C) = \sum_{k=1}^{N} v_k C_k, \quad (9)$$

and $S_i(C)$ equals the sum in (9) except for the exclusion of the i-th chip, $$S_i(C) = \sum_{k=1, \neq i}^{N} v_k C_k, \quad (10)$$

it can be shown that the correlation constraint (3) may be written as $$R_i = \frac{\pi}{8} \left\{ \frac{\sum_C \left[ \operatorname{erf}\left(\frac{S_i(C)+v_i}{\sqrt{2}}\right) - \operatorname{erf}\left(\frac{S_i(C)+v_i}{\sqrt{2}}\right) \right]^2}{\sum_C \exp\left(-\frac{S(C)^2}{2}\right)} \right\}; 1 \leq i \leq N. \quad (11)$$

Furthermore, the power loss factor, $L_p$, is given by $$L_p = \left( \frac{1 + \sum_{i=1}^{N} R_i}{2^{2N-1}\pi} \right) \left[ \sum_C \exp\left(-\frac{S(C)^2}{2}\right) \right]^2. \quad (12)$$

The system of equations consisting of (11) and (12) is provided with values for the power ratios $\{R_i\}$ and solved for the weighting coefficients $\{v_i\}$ for the signal codes in the non-Gaussian group and the loss factor $L_p$. The weighting coefficients determined by these equations weight the values of the respective signal codes such that the signal powers allocated to the component signal codes are substantially proportional to the square of the expected values of the cross-correlations between the respective component signal codes and the resultant composite signal formed from the weighted sum of the signals.

Having determined the weighting coefficients vi for all of the signal codes in both the Gaussian and non-Gaussian groups, these weighting coefficients can then by applied to the chip values of the signal codes to determine the values of the majority-voted composite chip value on a chip-by-chip basis over the period of time for which the present commanded power distribution is in effect. More specifically, in accordance with equation (1), at each chip interval, each signal code chip value $C_i(k)$ is multiplied by the corresponding weighting coefficient $v_i$, and all M weighted chip values $v_i C_i(k)$ are added to form a sum (operation 36 in FIG. 3). In operation 38, the value of the majority-voted composite signal, which may take on one of two possible logical values, is set in accordance with the sign of the sum of the weighted signal code chips for each chip interval. For example, if the sign of the sum is negative, the composite chip value is set to an analog value of −1 (logical 1), and if the sum is negative, the composite chip value is set to an analog value of 1 (logical 0).

Because the transmitted output signal cannot perfectly represent the multiple input signals combined by majority voting, the majority logic attempts to minimize the resulting loss in effective power experienced in a receiver detecting one of the original input signals when that receiver correlates the received signal with a time-aligned replica of its assigned CDMA code. The multiplexing loss is substantially the same for each user signal combined via majority logic, preventing any one signal from suffering excessive effective power loss at the expense of the others.

Note that, if each voted element were to represent a distinct bit of data, there would be a huge loss of fidelity in each time reducing values of the M signals to one value. However, in a direct sequence, pseudo-noise (PN) spread spectrum system, where the "voting element" can be one binary chip of a user-unique spread spectrum sequence, the averaging effect noted above occurs across all chips belonging to a specific bit interval, permitting each user to receive a signal in which his data bit is represented with a predetermined fidelity. This is true because majority voting is applied on a chip-by-chip basis, and there are generally a significant number of chips per each bit of information. Although individual chips of the combined signal will be incorrect relative to some of the corresponding chips of each of the original constituent chip sequences, over the span of an entire bit, many of the chips of the combined signal will accurately reflect the corresponding chips of each of the original sequences, allowing the information bit to be detected and correctly determined by a receiver with only a modest degree of signal degradation. Since communication signals are received in the presence of noise and other transmission anomalies, application of majority voting at the chip level amounts to imposing a measure of power control over the various multiplexed PN codes (i.e., the input signals to be combined). In other words, the multiplexing loss resulting from the majority logic technique of the present invention amounts to a measurable and controllable power loss for each signal being combined, with each signal preferably suffering a substantially proportionate amount of loss relative to its desired power level.

Because of the decomposition of the multiplexer inputs into the two groups, the number of nonlinear equations requiring iterative solution equals the size N of only the non-Gaussian group. Solution by the Newton-Raphson method proves successful because the appropriate partial derivatives of the functions are sufficiently well behaved. When a solution is found, there is also a guarantee that it is unique and therefore correct.

On some occasions all signals may be placed in the Gaussian group. One example of this occurs when all the signals are equal in power. This special case becomes important, for example, if a mobile terminal wants to transmit at a data rate higher than a single channel will permit. Multiplexing several codes can provide a solution, and the result as obtained by the above technique is superior in efficiency to that for linear multiplexing. 3. When a desired signal power allocation dictates that signal codes have equal power, the values of the signal codes are equally weighted in the majority vote.

Conditions are known for which the equations will produce a solution. This is the case whenever the total power allocated to the codes in the Gaussian group exceeds the individual power of each member of the non-Gaussian group. When these conditions are violated, there may still be solutions, but the solution cannot be guaranteed to adequately transmit each of the constituent signals. Since the violation can be detected in advance, there is no need to expend valuable time and computer resources in hunting a phantom solution. It should be emphasized that this inability to find a solution results from a limitation of the share-holder paradigm, i.e., non-existence of a solution under that model, and not an algorithmic failure of the iterative calculation. Thus, the method can find approximate solutions in cases where no true solution exists, but the quality of approximation will not be adequate in all cases. When the share-holder approach cannot synthesize the target power distribution, alternative techniques, discussed subsequently, are employed.

In the illustrated implementation, the equations are approximations that make good use of the Gaussian assumption. To the extent that this approximation holds for a given power distribution, the answers are numerically accurate. When the Gaussian hypothesis is less credible, there is some error in the realizing the target power distribution. There is also a quantization effect in the solutions, an error source discussed subsequently.

The error tolerance of the solution must be judged against some objective standard. In current CDMA schemes, power levels are assigned with granularity on the order of 1 dB, a change amounting to −20% or +26%. This fairly coarse grid permits useful solutions even when the Gaussian group criterion is but marginally valid. In any case for which the solution is not sufficiently accurate, refinement techniques mentioned subsequently are available.

The following describes application of the present invention to a scenario where weighting in proportion to the square root of the power would permit one large signal to "capture" the multiplexer. Instead, the technique of the present invention mitigates this possibility by an alternative weight assignment that achieves the commanded power distribution. The question of accuracy is also addressed. It should be observed, however, that this example is designed to illustrate operation of the technique of the present invention and is not intended to closely represent power ratios typically encountered in present day cellular systems.

In this example, there are sixteen signals with power requirement of 0.01 W and one signal requiring 4 W, corresponding to a commanded power ratio of R=4/(16×0.01)=25. That is, the desired power level of the large signal is 400 times greater than that of each of the individual small signals. The naive assignment (assuming the chips of each CDMA signal were weighted as in a linear multiplexer, in proportion to the square root of their power allocation) gives $\sqrt{0.01}=0.1$ votes to the small signals and $\sqrt{4}=2$ votes to the larger one, results in capture. That is, even if all sixteen small signals were to agree (e.g., all sixteen were +1 or all sixteen were −1), their 1.6 vote total would be overwhelmed by the 2-vote code, and the small signals would be completely suppressed.

According to the present invention, the sixteen small signals are classified as Gaussian, and the sum of desired power levels of the Gaussian signals is normalized to unity ($R_0=1$), such that each of the sixteen Gaussian signals has a normalized power of $\frac{1}{16}=0.0625$. Using the linear multiplexer approach for the Gaussian signals, each of the sixteen signals is assigned a weighting or vote of $\sqrt{0.0625}=0.25$. The normalized commanded power ratio of the non-Gaussian signal is $R_1=4/(16\times0.01)=25$ (i.e., 400 times the normalized power of each of the Gaussian signals).

Calculations according to equations (11) and (12) indicate that 1.71 votes should be allocated to the large code, with each of the small codes having a vote of 0.25 as determined above. A majority of seven or more among the small codes would be sufficient to outvote the large code (7×0.25>1.71). In this example, however, the smallest achievable majority occurs when there are twelve against and four with the large code, for a majority of eight (i.e., the large code is outvoted when twelve, thirteen, fourteen, fifteen or sixteen of the small codes have the opposite value of the large code). The probability that the large chip dominates is found to be 0.92, giving it a fraction $0.92^2=0.85$ of the transmitted power.

Any individual small chip influences the outcome only when the others vote exactly 11:4 against the large code. The probability of this event, 0.041, gives the small code a power fraction $0.041^2=0.0017$. Thus, the achieved relative gain is $=0.85/0.0017=500$, a discrepancy of 1 dB relative to the target power distribution giving the large code a power 400 times that of the smaller codes. The multiplexing loss is only 0.6 dB. Were this power distribution accuracy judged unacceptable, it could be improved by a cyclostationary technique that can be executed with arbitrarily good accuracy at the cost of additional multiplexing loss, as shown subsequently.

The time required to obtain a solution depends primarily on the number of signals in the non-Gaussian group and secondarily on the power ratios of those signals. An implementation as a C-language computer program running on an 864-MHz, Pentium-based PC shows that solutions may be obtained in 2–5 milliseconds for as many as eight or nine non-Gaussian components. The size of the Gaussian group is not a significant factor. This computation time is adequate for current and near-future CDMA loadings. Computation time begins to increase exponentially with the number of additional non-Gaussian components (a factor of ten increase per three new components), but this drawback can be mitigated by algorithm improvements, more efficient coding and exploitation of parallel processing. Future technology innovations can be relied upon to keep pace with demands of the cellular industry. Because the transmit power levels are quantized (to about 1 dB in current practice), solutions for certain cases may be precomputed and stored. This much simpler instantiation of the algorithm may be practical for certain cases, in particular for CDMA handset multi-code transmission.

Multiplex solutions obtained from the algorithm described above may be termed a stationary weighted majority voting rule in the sense that the resulting processing rule (i.e., the set of weighting coefficients) applied to each instantaneous set of component code chips is constant with time (i.e., over the duration in which a particular commanded power distribution or allocation is in effect). Other algorithmic techniques that can generate multiplex solutions are cyclostationary weighted majority voting rules in that the output multiplex rule exhibits time variation (i.e., the weighting coefficients are not constant during the period in which a particular power allocation is in effect). The time variation is applied periodically over the largest available coherent processing interval in the system, typically dictated by the shortest data bit or symbol interval employed by any component code. The class of cyclostationary algorithms supplements the stationary one when a solution lies beyond the latter's reach.

As an example, consider the case in which there are but two non-Gaussian components. It is possible to determine precise conditions under which the stationary algorithm cannot satisfy the target power distribution. Specifically, regardless of the target power of the non-Gaussian components, the stationary algorithm will not permit the high-power non-Gaussian components to dominate and completely suppress the lower-power Gaussian components. Consequently, where the non-Gaussian components have exceedingly high power relative to the non-Gaussian components, the stationary algorithm may arrive at a vote distribution that under-represents the non-Gaussian components (i.e., the non-Gaussian components fall disproportionately short of their target power) for the sake of avoiding complete dominance by the non-Gaussian components. Under those circumstances, a non-stationary solution can be configured from a periodic interlace of the best approximate stationary solution and the transmission of "solo chips" of the non-Gaussian components. A solo chip occurs if, independent of the set of input chips, the multiplexer output is the chip of one designated code. This is equivalent to temporarily giving the designated code an unbeatable number of votes. Therefore, the solution reverts to the stationary one most of the time, but for calculated fractions of the time, one or both of the non-Gaussian component codes are allocated solo chip slots, as a function of their desired power levels. These fractions are determined from the power distribution but are not in direct proportion to them in general. In this manner, target power distributions beyond the scope of unaided share-holder voting may be realized. In particular, each component in the multiplexed signal experiences approximately the same multiplexing loss, while relatively high-power non-Gaussian components can still be adequately represented without unduly suppressing the Gaussian components.

This methodology extends to other cases for which a cyclostationary solution is desired. As appropriate, the solo chip concept as employed above may be replaced by a "sub-majority vote" of a subset of codes. This sub-majority vote may in some cases be calculated by the share-holder technique. Although a "best" algorithm would always yield the most efficient solution, it is not necessary to optimize at this level of granularity when a given solution technique is shown to have acceptable efficiency.

Figure 5:
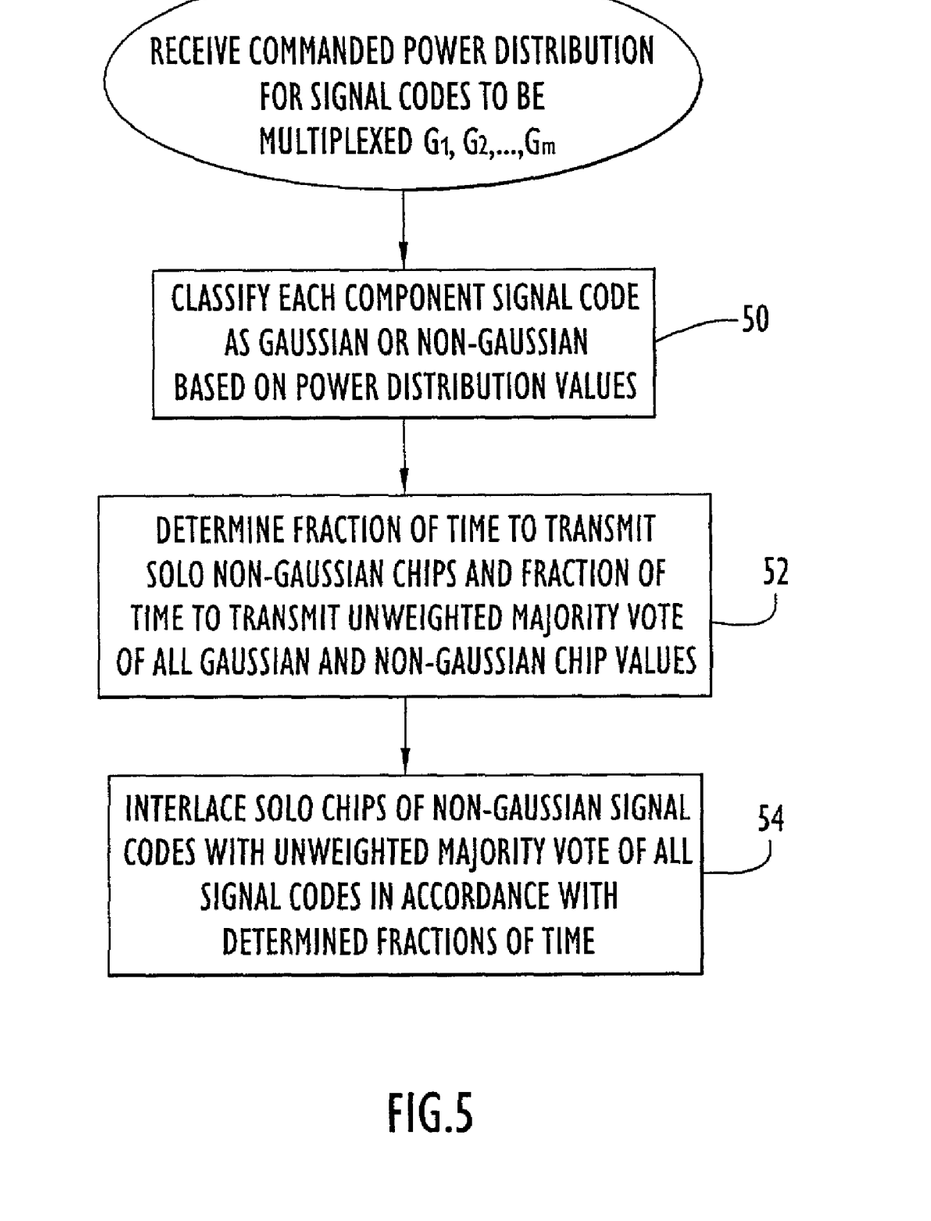
FIG. 5 is a functional flow diagram illustrating determination of signal code weighting coefficients used to compute a weighted sum of signal code chips in a cyclostationary majority logic scheme according to another embodiment of the present invention.
Figure 6:
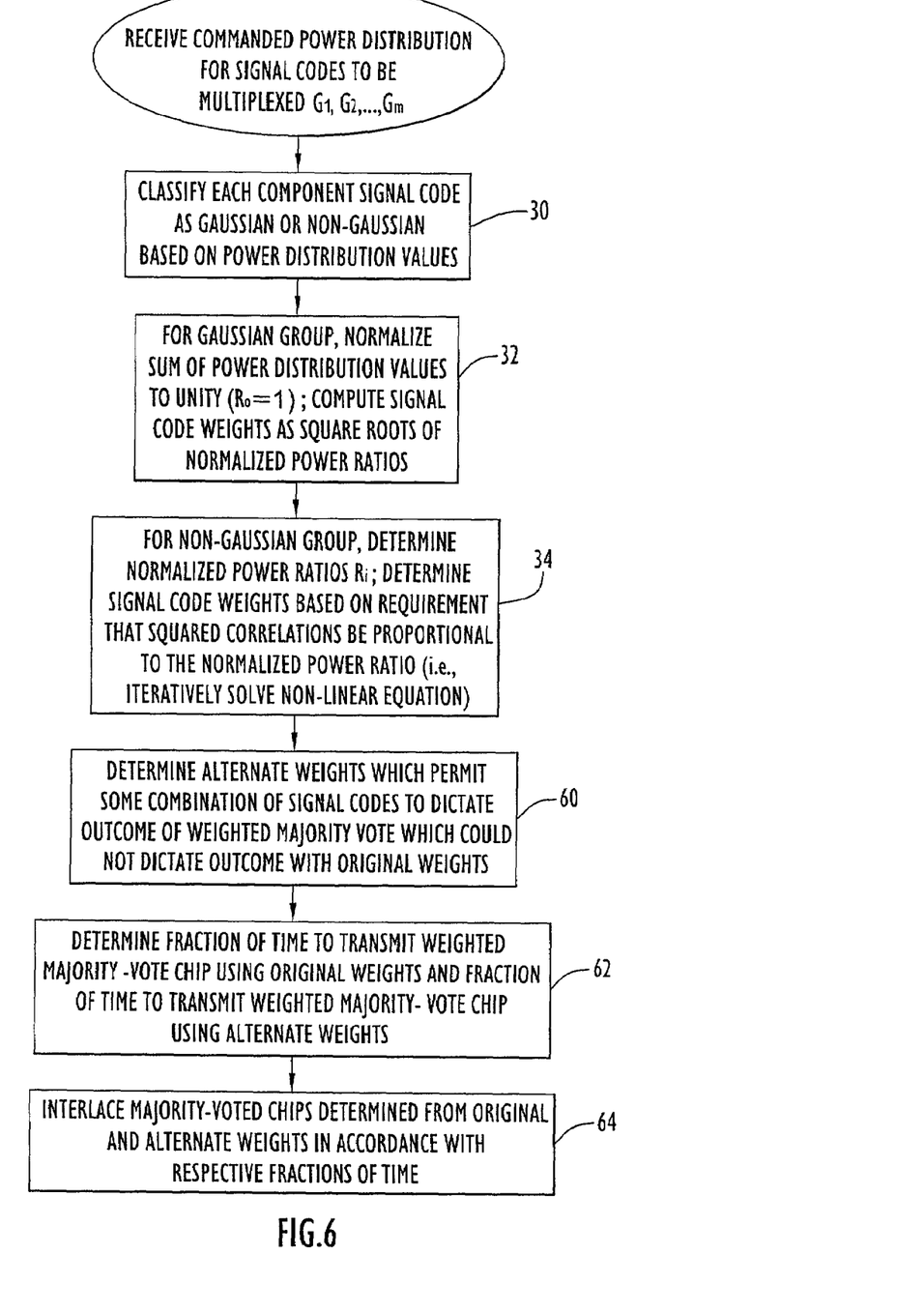
FIG. 6 is a functional flow diagram illustrating determination of signal code weighting coefficients used to compute a weighted sum of signal code chips in a cyclostationary majority logic scheme according to yet another embodiment of the present invention.

FIG. 5 illustrates an example of an embodiment of one cyclostationary approach in which solo chips of a non-Gaussian signal code are interlaced with an unweighted majority vote of all signal codes. FIG. 6 illustrates an example of an embodiment of another cyclostationary approach in which two different weighted majority vote schemes are applied to successive chips in an interlaced manner. In both these example, the cyclostationary methodology is applied to the case cited in the earlier example in order to improve the accuracy of the results, and two rather different solutions are given.

Recall that the commanded power distribution for one large code is 400 times greater than that of each of sixteen lesser codes. A cyclostationary solution to this problem can be found by interlacing solo chips of the large code with chips consisting of the unweighted majority vote of all 17 codes. The fraction of time devoted to each activity must be calculated to achieve the desired power distribution. Referring to FIG. 5, each of the component signal codes must be assigned to either the Gaussian group or the non-Gaussian group based on the commanded power distribution values (operation 50). In this case, this classification is necessary primarily to determine which of the codes will have solo chips transmitted (those in the non-Gaussian group) and which of the codes will be represented only in the majority-voted chips (those in the Gaussian group).

For the foregoing example, let the fraction of time devoted to solo chips be p and that to majority vote, 1−p. A small code can be shown to have correlation given by $$\alpha_1 = (1-p)\sqrt{17}\binom{16}{8}2^{-16} = 0.81(1-p). \quad (13)$$

This correlation contribution comes entirely from the majority-voted chips, since the codes are designed to be uncorrelated with one another. The large code, however, obtains correlation contributions from both chip types; its correlation, denoted by $\alpha_{17}$, is $$\alpha_{17} = 0.81 \cdot (1-p) + 1 \cdot p = 0.81 + 0.19p. \quad (14)$$

The relative gain constraint is imposed by requiring $$\frac{\alpha_{17}}{\alpha_1} = \sqrt{400} = 20 = \frac{0.81 + 0.19p}{0.81 \cdot (1-p)} \quad (15)$$

and solving for the fraction p (operation 52). The result is p=0.95; consequently, the solo chip of the large signal code is transmitted 95% of the time and the majority-voted signal code is transmitted 5% of the time in an interlace manner (operation 54). Note that the majority vote is an unweighted or true majority vote of all Gaussian and non-Gaussian signal codes (in this example, seventeen signals including one non-Gaussian code and sixteen Gaussian codes). While the commanded power distribution is achieved, the power loss of this solution is −1.8 dB.

A more effective remedy is found by making a cyclostationary modification to the original solution. As shown in FIG. 6, this original solution is obtained by performing operations 30, 32, and 34 in the same manner as described above in the stationary approach shown in FIG. 3. Recall that, in the example described above, the original solution prescribed that each of the sixteen small signals receive a weighting of 0.25, with the larger signal receiving a weighting of 1.71, such that if at least seven more of the small signals "voted" against the large signal than with the large signal (0.25×7=1.75), the large signal would be overruled in any given chip. The effective result of the original solution was a relative power ratio of 500, rather than the target 400. The principle from which this cyclostationary modification stems is that, even though the assigned votes may be any positive real numbers, the achieved gains are quantized by the fact that sufficiently small changes in the vote allocation will not change the solution until a break point is reached. A break point occurs when a slight change in vote allocation permits some coalition of votes to dominate in a situation where they previously could not. The solution leading to a relative gain of 500 is one such point. In this example, it can be shown that the next lowest ratio that can be achieved is 77.5. Specifically, this point is reached when a majority of only six (rather than seven) of the small signal codes can overrule the large signal code, or 6×0.25=1.5. This by itself certainly seems to be a less desirable achievement than 500, given that the desired ratio is 400. By combining the two solutions in a cyclostationary algorithm, however, a new solution can be obtained that achieves the desired ratio of 400.

This new solution consists of transmitting an interlace of two chip types. The first is as described in the original solution (i.e., small code weighting 0.25; large code weighting 1.71); the second is similar but uses a vote assignment in which the large code allocation is reduced to just under 1.5 votes. The latter, if used at every chip epoch, results in the 77.5 ratio mentioned above. As in the immediately preceding example, the fraction of time devoted to each weighting formula can be calculated to achieve the commanded requirement. This calculation shows that the "500" formula should be used 91% of the time, with the remaining 9% dedicated to the "77.5" formula. Once again, the solution accuracy improves in the sense that the commanded power distribution is achieved, but at the expense of power loss. In this case, the power loss increases from 0.6 to 1.1 dB, but is far short of the 1.8 dB power loss experienced with the cyclostationary solo-chip interlace approach previously described.

The foregoing examples illustrate the utility of incorporating the cyclostationary technique into the multiplex algorithm. Cyclostationary techniques provide an "averaging" mechanism to smooth over the inherent quantization effects of a stationary algorithm. The principles described herein can be applied to a wide variety of situations in which there are multiple codes at various power levels.

The described technique of the present invention can be used to synthesize network base station transmissions into a single PN sequence that represents all the required signals and accounts for the commanded power distribution. The present invention likewise facilitates techniques being considered for enabling mobile communication devices to operate at higher data rates, e.g. 56 kb/s, by splitting its data across perhaps seven codes and simultaneously transmitting all seven codes. This data rate is one thousand times that currently achieved in GPS.

The capability of the present invention to multiplex CDMA signals efficiently into a constant-envelope signal for application to this complex environment is unprecedented. A highly desirable property of the subject multiplex technique is its transparency to the receiving equipment. In each of the previously cited applications, the receiving terminal performs certain operations that enable the receiver to take advantage of built-in majority vote structure or redundancy. In strong contrast to that situation, a terminal receiving a signal multiplexed as described herein needs no knowledge of the multiplex procedure whatever in order to perform optimally. Because of this transparency, a mobile terminal may operate in a mixed environment, where some base stations employ the constant envelope multiplex and others do not. Similarly, no base station needs to know whether a particular mobile terminal is using linear or constant-envelope multiplexing to create a high data rate signal. If the mobile employs the latter, its design will include provisions to correctly interpret power control information received from the base station.

The performance improvement realized by the multiplexer is computed by differencing the gain in average transmitted power achieved in eliminating envelope variations and the multiplexing loss. (Multiplexing loss represents the decorrelation between the transmitted code and the receiver's reference code. It is a characteristic of the technique of the present invention that the relative multiplexing loss is constant for all receivers.) Results obtained by analysis and simulation show gains of over 3 dB for a handset transmitting at a 56 kb/s internet rate, and an average gain of 3 (+/−1) dB for the base station application.

The constant-envelope composite signal produced by the majority logic technique of the present invention results in a more power efficient mechanization than conventional linear multiplex methods that generate non-constant-envelope composite signals, because the power amplifiers that are used for transmission of the non-constant-envelope composite signals must operate in the linear region. Power amplifiers are much more efficient when operated in the saturated mode, which is possible with constant-envelope signals, such as that produced by the technique of the present invention.

For example, in a CDMA cellular telephone system, linear superposition of chip-synchronous, orthogonal signals to be transmitted from a base station is a theoretically lossless multiplex if the subsequent transmission chain remains linear. Maintaining linearity requires a linear high power amplifier (HPA). Since any HPA characteristic eventually saturates as its input power increases, such base station transceiver linear amplifiers are typically run at 4–5 dB average power backoff to accommodate peak power needs. In addition, the rather severe spectral containment filtering applied to each user signal before multiplexing creates amplitude fluctuations of 4–5 dB peak-to-average power, requiring additional backoff. Consequently, total backoff can easily be 9 or 10 dB in this particular context.

Thus, linear combination techniques are maximally efficient in the sense that there is no actual signal power loss, but the overall efficiency of such techniques is compromised by the need to operate the amplifier at a significant power back-off to accommodate the instantaneous signal envelope fluctuations. Further, conventional PSK/PM systems have limited power efficiency, because PSK/PM systems include unmodulated carrier and cross modulation terms, which represent wasted power.

The majority logic multiplexing technique of the present invention produces greater average power by achieving a more effective allocation of the loss budget between the multiplexer and the high power amplifier. Applied to orthogonal waveforms, the non-linear multiplex methods of the present invention produce a constant-envelope composite signal that permits a greater fraction of the available transmitter power to be used for communication, but at the expense of a multiplexing loss in the form of receiver cross-correlation mismatch. This multiplexing loss, however, is typically smaller than the power backoff it replaces, resulting in a favorable trade.

The majority logic multiplexing technique of the present invention can be integrated into virtually any communication device or signal transmission system which could benefit from transmitting a plurality of multiplexed signals in a composite signal, including, but not limited to, terrestrial and satellite communication and navigation systems (e.g., GPS, CDMA cellular networks), mobile communication systems, including wireless telephony, and other systems employing spread spectrum signals or CDMA.

Having described preferred embodiments of new and improved methods and apparatus for multiplexing signal codes via weighted majority logic, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method of multiplexing a plurality of signals to form a constant-envelope composite signal, comprising:
   (a) generating a composite signal based on a weighted majority vote of the plurality of signals, the composite signal being generated by weighting values of the plurality of signals to form weighted signal values, summing the weighted signal values to form a weighted sum, and setting a value of the composite signal in accordance with an arithmetic sign of the weighted sum and
   (b) modulating a carrier signal with the composite signal to form the constant-envelope composite signal.

2. The method of claim 1, wherein the values of the plurality of signals are weighted in accordance with a power allocation associated with the plurality of signals.

3. The method of claim 2, wherein the values of the plurality of signals are weighted as a function of expected cross-correlation values between the plurality of signals and the composite signal formed from the weighted sum of the plurality of signals.

4. The method of claim 3, wherein the values of the plurality of signals are weighted such that respective powers of the plurality of signals are substantially proportional to the square of the expected cross-correlation values.

5. The method of claim 2, wherein weighting coefficients used to weight the values of the plurality of signals are determined each time the power allocation changes.

6. The method of claim 1, wherein (a) includes:
   (a1) classifying each of the plurality of signals into one of a first group and a second group based on a power allocation associated with the plurality of signals;
   (a2) determining weighting coefficients of signals in the first group; and
   (a3) determining weighting coefficients of signals in the second group in a manner different from the first group.

7. The method of claim 6, wherein weighting coefficients of signals in the first group are determined in accordance with a square root function of the power allocation.

8. The method of claim 6, wherein weighting coefficients of signals in the second group are determined as a function of expected cross-correlation values between the signals in the second group and the composite signal.

9. The method of claim 1, wherein the weighted majority vote is based upon a stationary weighted majority voting rule.

10. The method of claim 1, wherein the weighted majority vote is based upon a cyclostationary weighted majority voting rule.

11. The method of claim 10, wherein the composite signal comprises interleaved values of individual signals interlaced with values of majority voted signals.

12. The method of claim 1, wherein the plurality of signals are Code Division Multiple Access (CDMA) data streams.

13. The method of claim 1, wherein the plurality of signals comprises chip-synchronous, pseudo-noise signal codes, and wherein values of the composite signal are determined on a chip-by-chip basis from weighted majority voting of the plurality of signals.

14. The method of claim 1, wherein a multiplexing loss resulting from multiplexing the plurality of signals is substantially the same for each of the plurality of signals.

15. The method of claim 1, wherein the values of the plurality of signals are weighted in accordance with an associated power allocation such that, when each of the plurality of signals is allocated an equal power, the values of the plurality of signals are equally weighted.

16. An apparatus for multiplexing a plurality of signals to form a constant-envelope composite signal, comprising:
   a majority logic unit receiving the plurality of signals and generating a composite signal based on a weighted majority vote of the plurality of signals;
   wherein the majority logic unit weights values of the plurality of signals to form weighted signal values, sums the weighted signal values to form a weighted sum, and sets a value of the composite signal in accordance with an arithmetic sign of the weighted sum and
   a modulator configured to modulate a carrier signal with the composite signal to form the constant-envelope composite signal.

17. The apparatus of claim 16, wherein the apparatus is a base station in a communication network.

18. The apparatus of claim 17, wherein the base station is in a terrestrial cellular network.

19. The apparatus of claim 16, wherein the apparatus is a mobile communication device.

20. The apparatus of claim 16, wherein the apparatus is a satellite.

21. The apparatus of claim 20, wherein the satellite is a global positioning system satellite.

22. The apparatus of claim 17, wherein said majority logic unit weights the values of the plurality of signals in accordance with a power allocation associated with the plurality of signals.

23. The apparatus of claim 22, wherein said majority logic unit weights the values of the plurality of signals as a function of expected cross-correlation values between the plurality of signals and the composite signal formed from the weighted sum of the plurality of signals.

24. The apparatus of claim 23, wherein said majority logic unit weights the values of the plurality of signals such that respective powers of the plurality of signals are substantially proportional to the square of the expected cross-correlation values.

25. The apparatus of claim 22, wherein said majority logic unit determines weighting coefficients used to weight the values of the plurality of signals each time the power allocation changes.

26. The apparatus of claim 16, wherein said majority logic unit classifies each of the plurality of signals into one of a first group and a second group based on a power allocation associated with the plurality of signals, determines weighting coefficients of signals in the first group; and determines weighting coefficients of signals in the second group in a manner different from the first group.

27. The apparatus of claim 26, wherein said majority logic unit determines weighting coefficients of signals in the first group in accordance with a square root function of the power allocation.

28. The apparatus of claim 26, wherein said majority logic unit determines weighting coefficients of signals in the second group as a function of expected cross-correlation values between the signals in the second group and the composite signal.

29. The apparatus of claim 16, wherein the weighted majority vote is based upon a stationary weighted majority voting rule.

30. The apparatus of claim 16, wherein the weighted majority vote is based upon a cyclostationary weighted majority voting rule.

31. The apparatus of claim 30, wherein the composite signal comprises interleaved values of individual signals interlaced with values of majority voted signals.

32. The apparatus of claim 16, wherein the plurality of signals are Code Division Multiple Access (CDMA) data streams.

33. The apparatus of claim 16, wherein the plurality of signals comprises chip-synchronous, pseudo-noise signal codes, and wherein said majority logic unit determines values of the composite signal on a chip-by-chip basis from weighted majority voting of the plurality of signals.

34. The apparatus of claim 16, wherein a multiplexing loss resulting from multiplexing the plurality of signals is substantially the same for each of the plurality of signals.

35. The apparatus of claim 16, wherein said majority logic unit weights the values of the plurality of signals in accordance with an associated power allocation such that, when each of the plurality of signals is allocated an equal power, said majority logic unit equally weights the values of the plurality of signals.

36. An apparatus for multiplexing a plurality of signals to form a constant-envelope composite signal, comprising:
    means for generating a composite signal based on a weighted majority vote of the plurality of signals;
    wherein the means for generating includes: means for weighting values of the plurality of signals to form weighted signal values, means for summing the weighted signal values to form a weighted sum, and means for setting a value of the composite signal in accordance with an arithmetic sign of the weighted sum and
    means for modulating a carrier signal with the composite signal to form the constant-envelope composite signal.

37. The apparatus of claim 36, wherein the apparatus is a base station in a communication network.

38. The apparatus of claim 37, wherein the base station is in a terrestrial cellular network.

39. The apparatus of claim 36, wherein the apparatus is a mobile communication device.

40. The apparatus of claim 36, wherein the apparatus is a satellite.

41. The apparatus of claim 40, wherein the satellite is a global positioning system satellite.

42. The apparatus of claim 38, wherein said means for weighting weights the values of the plurality of signals in accordance with a power allocation associated with the plurality of signals.

43. The apparatus of claim 42, wherein said means for weighting weights the values of the plurality of signals as a function of expected cross-correlation values between the plurality of signals and the composite signal formed from the weighted sum of the plurality of signals.

44. The apparatus of claim 43, wherein said means for weighting weights the values of the plurality of signals such that respective powers of the plurality of signals are substantially proportional to the square of the expected cross-correlation values.

45. The apparatus of claim 42, wherein said means for weighting determines weighting coefficients used to weight the values of the plurality of signals each time the power allocation changes.

46. The apparatus of claim 36, wherein said means for generating classifies each of the plurality of signals into one of a first group and a second group based on a power allocation associated with the plurality of signals, determines weighting coefficients of signals in the first group; and determines weighting coefficients of signals in the second group in a manner different from the first group.

47. The apparatus of claim 46, wherein said means for generating determines weighting coefficients of signals in the first group in accordance with a square root function of the power allocation.

48. The apparatus of claim 46, wherein said means for generating determines weighting coefficients of signals in the second group as a function of expected cross-correlation values between the signals in the second group and the composite signal.

49. The apparatus of claim 36, wherein the weighted majority vote is based upon a stationary weighted majority voting rule.

50. The apparatus of claim 36, wherein the weighted majority vote is based upon a cyclostationary weighted majority voting rule.

51. The apparatus of claim 50, wherein the composite signal comprises interleaved values of individual signals interlaced with values of majority voted signals.

52. The apparatus of claim 36, wherein the plurality of signals are Code Division Multiple Access (CDMA) data streams.

53. The apparatus of claim 36, wherein the plurality of signals comprises chip-synchronous, pseudo-noise signal codes, and wherein said means for generating determines values of the composite signal on a chip-by-chip basis from weighted majority voting of the plurality of signals.

54. The apparatus of claim 36, wherein a multiplexing loss resulting from multiplexing the plurality of signals is substantially the same for each of the plurality of signals.

55. The apparatus of claim 36, wherein said means for generating weights the values of the plurality of signals in accordance with an associated power allocation such that, when each of the plurality of signals is allocated an equal power, said means for generating equally weights the values of the plurality of signals.

* * * * *

UNITED STATES PATENT AND TRADEMARK OFFICE
CERTIFICATE OF CORRECTION

| | | |
|---|---|---|
| PATENT NO. | : 7,035,245 B2 | Page 1 of 1 |
| APPLICATION NO. | : 10/083655 | |
| DATED | : April 25, 2006 | |
| INVENTOR(S) | : Orr et al | |

It is certified that error appears in the above-identified patent and that said Letters Patent is hereby corrected as shown below:

In column 20, line 34, change "17" to --16--.

In column 21, line 50, change "38" to --36--.

Signed and Sealed this

Twenty-second Day of August, 2006

JON W. DUDAS
*Director of the United States Patent and Trademark Office*